US009804034B2

(12) United States Patent
Jefferies et al.

(10) Patent No.: US 9,804,034 B2
(45) Date of Patent: Oct. 31, 2017

(54) EVSE WITH CORDSET HANDLE TEMPERATURE MEASUREMENT

(71) Applicant: SCHNEIDER ELECTRIC USA, INC., Palatine, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Raleigh, NC (US); Richard K. Weiler, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 448 days.

(21) Appl. No.: 14/541,617

(22) Filed: Nov. 14, 2014

(65) Prior Publication Data

US 2016/0138980 A1    May 19, 2016

(51) Int. Cl.
*G01K 13/00* (2006.01)
*G01K 7/24* (2006.01)
(Continued)

(52) U.S. Cl.
CPC .......... *G01K 13/00* (2013.01); *B60L 11/1816* (2013.01); *B60L 11/1818* (2013.01);
(Continued)

(58) Field of Classification Search
CPC .. H01R 13/7137; H02J 7/047; B60L 11/1816; B60L 11/1818; G01K 7/16; G01K 7/24; G01K 13/00
See application file for complete search history.

(56) References Cited

U.S. PATENT DOCUMENTS

| 2,991,397 A | 6/1961 | Place |
| 3,947,759 A | 3/1976 | Briggs |

(Continued)

FOREIGN PATENT DOCUMENTS

| CN | 103107512 | 5/2013 |
| DE | 10 2009 034886 | 2/2011 |

(Continued)

OTHER PUBLICATIONS

Computer translation of EP 2581256 from the EPO website. Mar. 30, 2017.*

(Continued)

*Primary Examiner* — Randy Gibson
(74) *Attorney, Agent, or Firm* — Locke Lord LLP (57) ABSTRACT

A circuit measures temperature in a charging handle 150 of an electric vehicle charging station (EVSE) 100. A temperature sensor is connected between a control pilot line 115 and ground line G in the charging handle of the EVSE. The control pilot line transmits a square wave signal CP having positive and negative portions, to an electric vehicle, according to the SAE J1772 standard. A temperature monitor 300 in the EVSE, coupled to a pilot signal measurement circuit 230 in the EVSE, measures the negative portions of the square wave signal resulting from the temperature sensor conducting current in response to changes in temperature in the handle. Temperature measurement of the charging handle is achieved without significant added cost or complexity, by reusing existing components in the EVSE, with little or no modification required to EVSE electronics, and minimal modification of the handle.

13 Claims, 6 Drawing Sheets

(51) Int. Cl.
  *B60L 11/18* (2006.01)
  *H02J 7/04* (2006.01)
  *G01K 7/16* (2006.01)
  *H01R 13/713* (2006.01)

(52) U.S. Cl.
  CPC ............... *G01K 7/16* (2013.01); *G01K 7/24* (2013.01); *H01R 13/7137* (2013.01); *H02J 7/047* (2013.01)

(56) References Cited

U.S. PATENT DOCUMENTS

| | | | |
|---|---|---|---|
| 5,351,005 | A | 9/1994 | Rouse et al. |
| 5,504,414 | A | 4/1996 | Kinoshita |
| 5,548,200 | A | 8/1996 | Nor et al. |
| 6,510,793 | B1 | 1/2003 | Kerr et al. |
| 8,013,570 | B2 | 9/2011 | Baxter |
| 8,106,627 | B1 | 1/2012 | Rossi |
| 8,294,415 | B2 | 10/2012 | Fujitake |
| 8,368,349 | B2 | 2/2013 | Zyren |
| 8,498,087 | B2 * | 7/2013 | Rabu ............... H01R 13/7137 361/104 |
| 8,558,504 | B2 | 10/2013 | Brown et al. |
| 8,643,330 | B2 | 2/2014 | Nergaard et al. |
| 8,698,346 | B2 | 4/2014 | Kamaga |
| 9,093,724 | B2 | 7/2015 | Fujitake |
| 9,148,027 | B2 | 9/2015 | Shane et al. |
| 9,156,362 | B2 * | 10/2015 | Soden ................ B60L 3/04 |
| 9,233,611 | B2 | 1/2016 | Klesyk |
| 9,365,123 | B2 * | 6/2016 | Flack ................ B60L 3/04 |
| 2008/0103552 | A1 | 5/2008 | Goetz et al. |
| 2009/0167537 | A1 | 7/2009 | Feliss et al. |
| 2009/0316321 | A1 | 12/2009 | Ouwerkerk |
| 2010/0225271 | A1 | 9/2010 | Oyobe et al. |
| 2011/0010043 | A1 | 1/2011 | Lafky |
| 2011/0144823 | A1 | 6/2011 | Muller et al. |
| 2011/0169447 | A1 | 7/2011 | Brown et al. |
| 2011/0172839 | A1 | 7/2011 | Brown |
| 2012/0032636 | A1 | 2/2012 | Bianco |
| 2012/0098490 | A1 | 4/2012 | Masuda |
| 2012/0119702 | A1 | 5/2012 | Gaul et al. |
| 2012/0229089 | A1 | 9/2012 | Bemmel et al. |
| 2012/0245880 | A1 | 9/2012 | Nabrotzky |
| 2012/0249066 | A1 * | 10/2012 | Ichikawa ............ B60K 6/445 320/109 |
| 2012/0249070 | A1 | 10/2012 | Sellner et al. |
| 2012/0277927 | A1 | 11/2012 | Watkins et al. |
| 2012/0287542 | A1 | 11/2012 | Bianco |
| 2013/0069441 | A1 | 3/2013 | Verghese et al. |
| 2013/0217409 | A1 | 8/2013 | Bridges et al. |
| 2014/0015487 | A1 | 1/2014 | Brown et al. |
| 2014/0035527 | A1 | 2/2014 | Hayashigawa et al. |
| 2014/0049213 | A1 | 2/2014 | Bianco |
| 2014/0049218 | A1 | 2/2014 | Morand et al. |
| 2014/0179164 | A1 | 6/2014 | Kanamori et al. |
| 2014/0203777 | A1 | 7/2014 | Flack |
| 2014/0232182 | A1 | 8/2014 | Kinomura et al. |
| 2015/0291043 | A1 * | 10/2015 | Nam ................ B60L 11/184 320/137 |
| 2015/0303737 | A1 | 10/2015 | Steinbuchel et al. |
| 2016/0009191 | A1 * | 1/2016 | Becker ............... H02J 7/0027 320/152 |
| 2016/0031335 | A1 * | 2/2016 | Soden ................ B60L 3/04 320/107 |
| 2016/0075244 | A1 * | 3/2016 | Im ................... B60L 11/1816 320/107 |
| 2016/0082852 | A1 * | 3/2016 | Kim ................. B60L 11/1818 307/125 |
| 2016/0137079 | A1 * | 5/2016 | Jefferies ............ B60L 11/1816 320/109 |
| 2016/0257218 | A1 * | 9/2016 | Flack ................ B60L 3/04 |
| 2017/0066340 | A1 * | 3/2017 | Flack ................ B60L 3/04 |

FOREIGN PATENT DOCUMENTS

| | | |
|---|---|---|
| EP | 2190102 | 5/2010 |
| EP | 2332771 | 6/2011 |
| EP | 2432094 | 3/2012 |
| EP | 2581256 | 4/2013 |
| EP | 2800222 | 11/2014 |
| JP | 2013027144 | 2/2013 |
| WO | WO 2012129104 | 9/2012 |
| WO | WO2013124841 | 8/2013 |
| WO | WO2014036013 | 3/2014 |
| WO | WO 2014155947 | 10/2014 |

OTHER PUBLICATIONS

Computer translation of DE 10209034886 from the EPO website. Mar. 30, 2017.*
ChargePoint Charging Station-Press release Jul. 18, 2013.
Vitor Monteiro, et al, "Comparison of Charging Systems for Electric Vehicles and Their Impact on Electrical Grid", Annual Seminar on Automation, Industrial Electronics and Instrumentation 2012—SAAEI'12, pp. 440-445, Guimaraes, Portugal, Jul. 2012, ISBN: 978-972-98603-5-5.
(R) SAE Electric Vehicle Conductive Charge Coupler, SAE J1772, Revised—Aug. 2001, Prepared by the SAE EV Charging Systems Committee.
Extended European Search Report for Application No. 15193312.4-1807 dated May 2, 2016.
SAE J1772TM JAN2010, SAE Electrical Vehicle and Plug in Hybrid Electric Conductive Charge Coupler: published 2010.
https://code.google.com/archive/p/open-evse/wikis/Hydra.wiki Apr. 6, 2017.

* cited by examiner

EVSE WITH CORDSET HANDLE TEMPERATURE MEASUREMENT

BACKGROUND OF THE INVENTION

1. Field of the Invention

The invention disclosed relates to electric vehicle supply equipment.

2. Discussion of the Related Art

Plug-in electric vehicles (EVs), including all-electric cars, neighborhood electric vehicles and plug-in hybrids, are becoming a popular mode for personal transportation, in part because they are less expensive to operate and have a reduced carbon footprint. Electric vehicle charging stations, also called Electric Vehicle Supply Equipment (EVSE), provide power to an EV through a standardized interface. The interface is defined by industry standard SAE J1772. The interface includes defined control signals, ground, and a high ampere current path. In the Level 2 alternating current (AC) charging standard, the EVSE may provide up to 80 A charging current to the connected EV.

The high ampere current path includes multiple junctions between conductors. The connection point between the cordset handle or charging handle of the EVSE and the receptacle of the EV is an example of a pin and socket junction. The construction of the EVSE charging handle commonly includes junctions that connect the wires of the cordset cable and the pins of the handle.

These multiple junctions represent opportunities for resistive heating along the current path between the EVSE and EV. For example, with manufacturing tolerances, mechanical ageing and reduction of contact pressure, chemical corrosion or oxidation of mating surfaces, or misuse and abuse leading to degraded performance, the current path within the EVSE charging handle can become increasingly resistive. Increased resistance may lead to overheating and possibly melting the charging handle while the handle is fastened to the EV during charging operations.

The present version of the J1772 does not require any monitoring of the temperature in the current path. However, with the possibility of degraded performance at the junctions in the EVSE cordset caused by heating, it would be advantageous to monitor the temperature of the charging handle. Knowing the temperature of the charging handle would allow for remediation, such as reducing the charging rate, aborting the charging session, or alerting the owner/operator for maintenance to be performed.

Present solutions for monitoring the temperature within the EVSE charging handle require additional, dedicated connection components between a temperature measurement device and the EVSE electronics. These include using additional conductors within the EVSE cord beyond those specified by the J1772 standard, or alternately using a wireless data transmission from the measurement device in the handle to the electronics of the EVSE. Present solutions to achieve temperature monitoring are prohibitively expensive and complicated to implement in the EVSE.

SUMMARY OF THE INVENTION

The subject invention reduces the chances of overheating and possibly melting the charging handle while the handle is fastened to the EV during charging operations. The subject invention achieves the benefit of temperature measurement of the charging handle of an electric vehicle charging station or EVSE, without significant added cost or complexity. The invention reuses existing components in the EVSE to achieve temperature measurement, with little or no modification required to the EVSE control electronics, and minimal modification required to the charging handle.

The invention provides a circuit for temperature measurement in a charging handle of an EVSE that includes a temperature sensor, such as a diode and a thermistor, connected between a control pilot line and a ground line in the charging handle. The temperature sensor is coupled to the control pilot line so that a change in current conducted from the ground line to the control pilot line occurs when the temperature sensor is exposed to a change in temperature in the charging handle. The control pilot line is coupled to a control pilot signal generator in the EVSE, which transmits a square wave control pilot signal having positive and negative voltage portions to an electric vehicle connected to the charging handle, according to the SAE J1772 standard. A temperature monitor in the EVSE is coupled to a pilot signal measurement circuit to measure changes in the negative portions of the control pilot signal resulting from the temperature sensor conducting current from the ground line to the control pilot line in response to changes in the temperature in the charging handle.

The temperature monitor utilizes existing components in the EVSE to achieve temperature measurement, with little or no modification required to the EVSE control electronics. In this manner, temperature measurement within the handle is achieved without significant added cost or complexity and minimal modification of the handle. The chances of overheating and possibly melting the charging handle while the handle is fastened to the EV during charging operations are thus reduced.

In an example alternate embodiment of the EVSE, at the stage before charging starts, an EVSE pilot signal generation circuit interprets a negative control pilot signal that is more positive than −12 volts, as abnormal behavior for an EV load. After charging starts, the EVSE pilot signal generation circuit interprets a negative control pilot signal that is more positive than −12 volts, as a temperature change, and not as abnormal behavior for an EV load.

DETAILED DESCRIPTION OF EMBODIMENTS OF THE INVENTION

Figure 1:
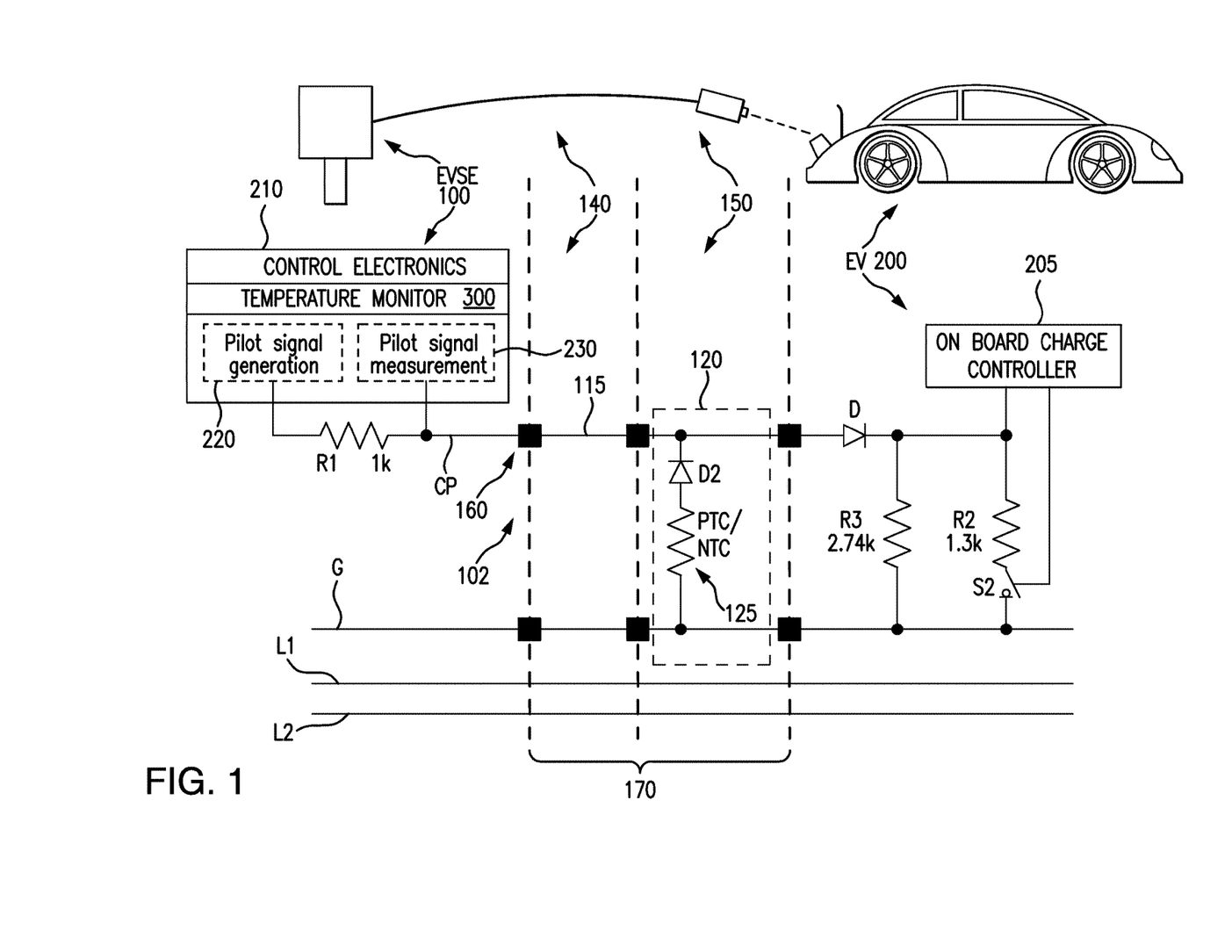
FIG. 1 is a functional block diagram of an example EVSE with a charging handle temperature sensor. The charging handle is shown with a diode D2 and thermistor inside the charging handle, connected between a control pilot line and a ground line.

FIG. 1 shows an example charging system in either a private or a public location, comprising an EVSE 100 connected by a cordset 170 comprising a charging cable 140 and charging handle 150, to a power inlet of an EV 200, for charging the EV's rechargeable batteries. The EVSE's charging cable and charging handle provide AC charging current to the EV on power conductors L1 and L2 and ground conductor G, which is converted to regulated direct current by a charger onboard the EV, for replenishing the charge of the rechargeable batteries. The EVSE generates a control pilot signal CP on control pilot line 115 of the charging cable and charging handle. The control pilot signal CP functions to verify that an EV is present and connected, permits energization/de-energization of the charging current, and provides a maximum available current rating to the EV. The rechargeable batteries power at least one electric motor to propel the EV, based on driver input to the EV's accelerator pedal.

The invention provides temperature measurement in a cordset handle or charging handle of an EVSE, with little or no modification required to EVSE electronics and minimal modification of the charging handle.

The functional block diagram of FIG. 1 illustrates an example EVSE 100 with the charging handle temperature sensor 120 comprising the diode D2 and thermistor 125 inside the charging handle or connector 150, connected between the control pilot line 115 and ground G lines. The thermistor 125 may be either a negative temperature coefficient (NTC) thermistor or a positive temperature coefficient (PTC) thermistor.

The EVSE includes a temperature monitor 300 within the control electronics 210 of the EVSE, which is coupled to a pilot signal measurement circuit 230. The temperature monitor 300 determines whether a temperature in the charging handle is above acceptable limits, based on a reading of the negative voltage level of the control pilot signal. The temperature monitor 300 utilizes existing components in the EVSE to achieve temperature measurement with little or no modification required to the EVSE control electronics.

The EVSE 100 may operate based on the SAE J1772 standard, to provide 208 to 240 volt AC, single phase power for a maximum continuous current of 32 Amperes, on the power conductors L1 and L2 and ground conductor G of the EVSE cordset 170. The SAE J1772 standard specifies that the control pilot signal CP functions, as discussed above, on the control pilot line 115 of the EVSE cordset 170.

The control pilot signal specified in the SAE J1772 standard is a 1 kHz square wave signal in the range of +12 and −12 volts. The control pilot signal uses its voltage to define the state of the charging transaction. If the 1 kHz square wave signal positive voltage is +12 volts, this indicates State A, that an EV is not connected. If the 1 kHz square wave signal positive voltage is +9 volts and the minus voltage is −12 volts, this indicates State B, that an EV is connected, but is not ready to receive a charge. The SAE J1772 standard specifies that the 1 kHz square wave signal positive voltage of +6 volts and the minus voltage is −12 volts, indicates State C, that the EV is ready to accept the charge. The EV performs this signaling by using the resistors R2 and R3 and the diode D, to condition the positive voltage as +6 volts and the minus voltage as −12 volts on the control pilot line 115, thereby signaling State C to the EVSE, that a charging handle is connected and an EV is ready to receive the charge.

When an EV connects to the electric vehicle charging handle 150, the EV issues a State B signal over a control pilot signal line 115, indicating that the EV is connected, but is not ready to accept energy. The EVSE learns of the presence of an EV connected to its charging handle 150, by means of the pilot signal measurement circuit 230 in the EVSE. The pilot signal measurement circuit 230 is connected to the control pilot line 115 from the charging handle 150. The pilot signal measurement circuit 230 receives an indication via the control pilot line 115 representing a connection state of the charging handle 150.

The control pilot signal CP specified in the SAE J1772 standard is a pulse width modulated (PWM) square wave. The duty cycle or ratio of the high state to the low state of the square wave is set by the EVSE, to represent the maximum available current on the EVSE power conductors L1 and L2. The EVSE sets the duty cycle of the control pilot signal, which represents the offered charging rate. When an EV is directly connected by the cordset 170 to the EVSE 100, the offered charging rate is made to the EV and the EV must comply with the settings required by the EVSE for the duty cycle. Example duty cycles and offered charging rates specified in SAE J1772, are shown in Table 1:

TABLE 1

| Amperes | Duty Cycle |
|---|---|
| 6 A | 10% |
| 12 A | 20% |
| 18 A | 30% |
| 24 A | 40% |
| 30 A | 50% |

The EVSE signals to the EV over the control pilot line 115, indicating the amount of the maximum available current. The EVSE includes a pilot signal generation circuit 220, coupled to the control pilot line 115. The pilot signal generation circuit 220 transmits respective charging rate offer indications via the control pilot line 115, representing the determined available charging rate to be offered to the EV for charging.

For example, if the EVSE has a maximum available current of 24 Amperes, it would set the duty cycle of the control pilot signal at 40%. The temperature monitor 300 has received indications from the pilot signal measurement circuit 230 that there is an EV connected to handle 150. The EVSE may then determine that the available charging rate to be offered to the EV is the full available charging rate of 24 Amperes. Thus, the pilot signal generation circuit 220 transmits a charging rate offer indication of 24 Amperes, by setting the duty cycle of the control pilot signal at 40% on the control pilot line 115.

The EV then responds by issuing a State C signal over a control pilot signal line CP, indicating that the EV is ready to accept energy. The EVSE then proceeds to deliver the charging current to the EV over its power lines L1 and L2, at the offered charging rate.

According to the SAE J1772 standard interface, when connected to an EV, the EVSE control electronics generates a square wave control pilot signal of +/−12V that is applied to the control pilot line 115 at the pilot signal generation output of the control electronics. The EVSE measures the signal formed by the voltage divider circuit, from the pilot signal generation output, through R1, D, R3, and R2 and S2, when S2 is closed, as controlled by the EV on board charge controller. Measuring the pilot signal formed by the voltage divider allows the EVSE to detect the connection of the vehicle. The EVSE differentiates the EV from other loads based on the different divider circuit formed during the positive and negative parts of the pilot signal duty cycle, due to the reverse bias of diode D during the negative duty cycle. The EVSE further detects when the EV is ready to accept charge, based on the different voltage dividers formed in the two states of switch S2.

As described in SAE J1772, the defined use of the negative part of the pilot signal duty cycle in the interface standard, is to differentiate between a connected EV and other impedance loads. The invention takes advantage of the otherwise very briefly used negative part of the duty cycle, to add temperature measurement capability to the EVSE charging handle. With diode D2 and the thermistor 125 in series from the control pilot to ground, the voltage measured at the pilot signal measurement input of the EVSE control electronics during the negative part of the pilot signal duty cycle, depends on the temperature of the thermistor 125.

Figure 2:
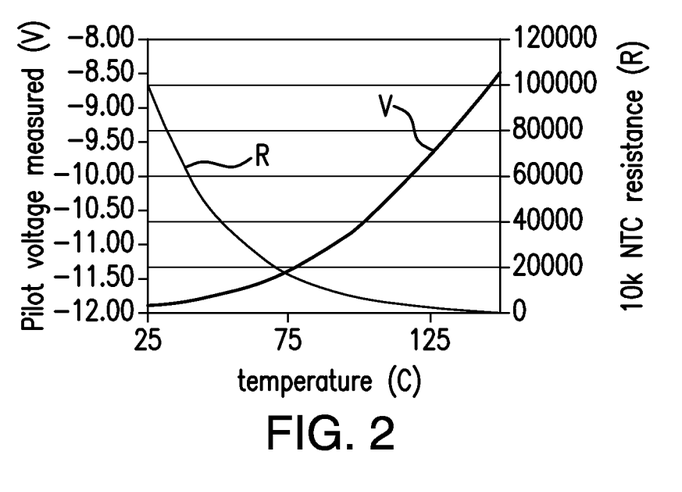
FIG. 2 is an example graph of measured control pilot signal voltage and negative temperature coefficient (NTC) thermistor resistance vs temperature, for control pilot signal measurement values during the negative part of the control pilot signal.

FIG. 2 is an example graph of measured pilot signal voltage and NTC thermistor 125 resistance vs temperature, for pilot signal measurement values during the negative part of the pilot signal. Table 2 presents the pilot voltage applied, measured pilot signal voltage, NTC thermistor 125 resistance, and temperature for pilot signal measurement values during the negative part of the pilot signal.

TABLE 2

| Temp. (C.) | NTC resistance | pilot voltage applied | pilot voltage measured |
|---|---|---|---|
| 25 | 100000 | −12 | −11.88 |
| 30 | 85000 | −12 | −11.86 |
| 40 | 59500 | −12 | −11.80 |
| 50 | 41650 | −12 | −11.73 |
| 60 | 29155 | −12 | −11.61 |
| 70 | 20409 | −12 | −11.46 |
| 80 | 14286 | −12 | −11.26 |
| 90 | 10000 | −12 | −11.00 |
| 95 | 8500 | −12 | −10.86 |
| 100 | 7225 | −12 | −10.70 |
| 105 | 6141 | −12 | −10.53 |
| 110 | 5220 | −12 | −10.34 |
| 115 | 4437 | −12 | −10.14 |
| 120 | 3772 | −12 | −9.92 |
| 125 | 3206 | −12 | −9.69 |

The placement of the thermistor 125 determines the temperature that will be measured by the EVSE. Depending on the design of the EVSE cordset and charging handle, it may be desireable to measure the temperature of a specific conductor or nonconducting part of the handle. Connecting the thermistor 125 thermally, but not electrically, to a specific part of interest, allows separation of the measurement signaling done with the control pilot signal, and the desired element in the handle being measured.

To avoid interference with the normal interaction between the EVSE and EV and detection of the EV connection, the invention enables the temperature measurement only when the EV is connected and the EVSE is outputting the square wave signal on the pilot signal line 115.

Figure 3:
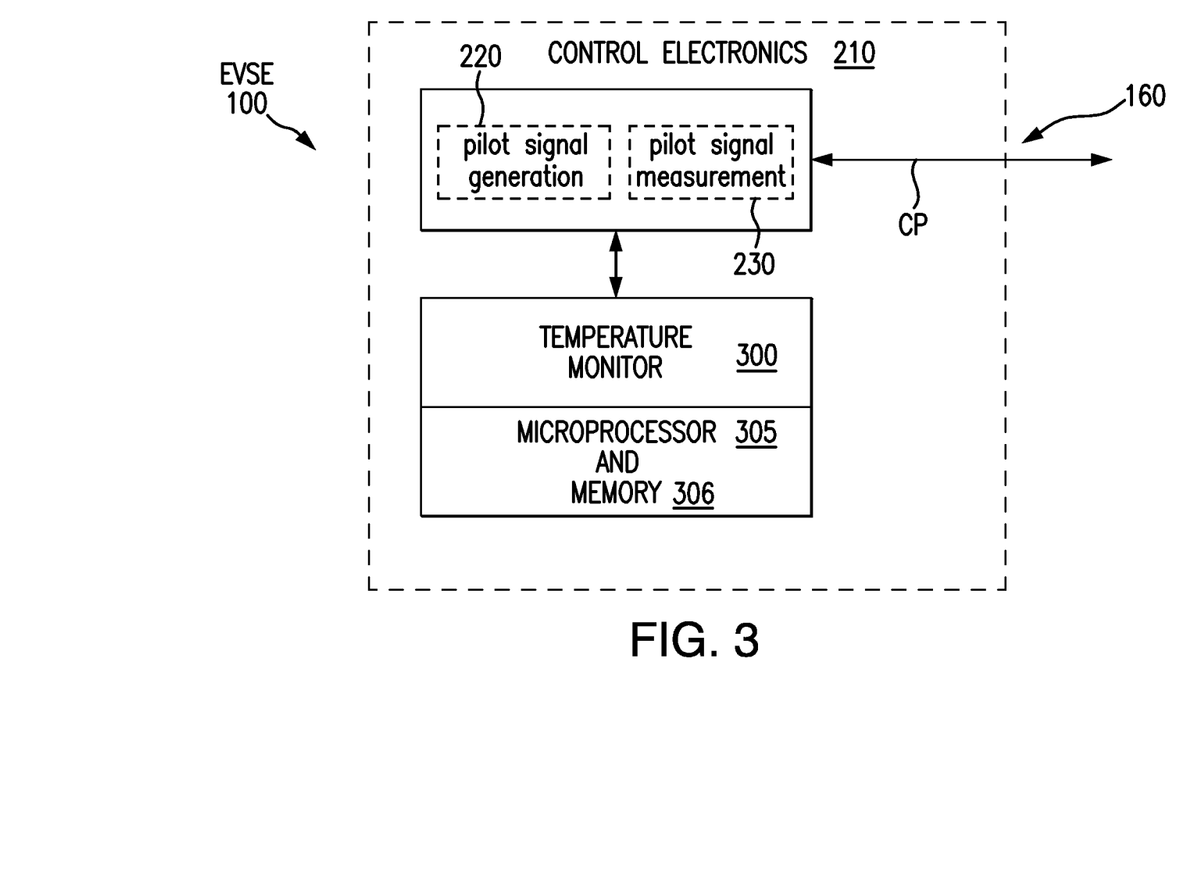
FIG. 3 is a more detailed functional block diagram showing the temperature monitor in control electronics of the EVSE, which is coupled to a pilot signal measurement circuit. The temperature monitor determines whether a connector temperature in the charging handle is above acceptable limits.

FIG. 3 is a more detailed functional block diagram showing an example temperature monitor 300 in control electronics 210 of the EVSE, which is coupled to a pilot signal measurement circuit 230. The temperature monitor determines whether the connector temperature in the charging handle is above acceptable limits. An example temperature monitor 300 may be embodied as computer code instructions stored in the memory 306 of the programmed microprocessor 305. When the microprocessor 305 executes the instructions, the temperature monitoring functions of the EVSE may be carried out. The temperature monitor utilizes an existing microprocessor 305 and memory 306 in the EVSE, to achieve temperature measurement, with little or no modification required to the EVSE control electronics.

Figure 4:
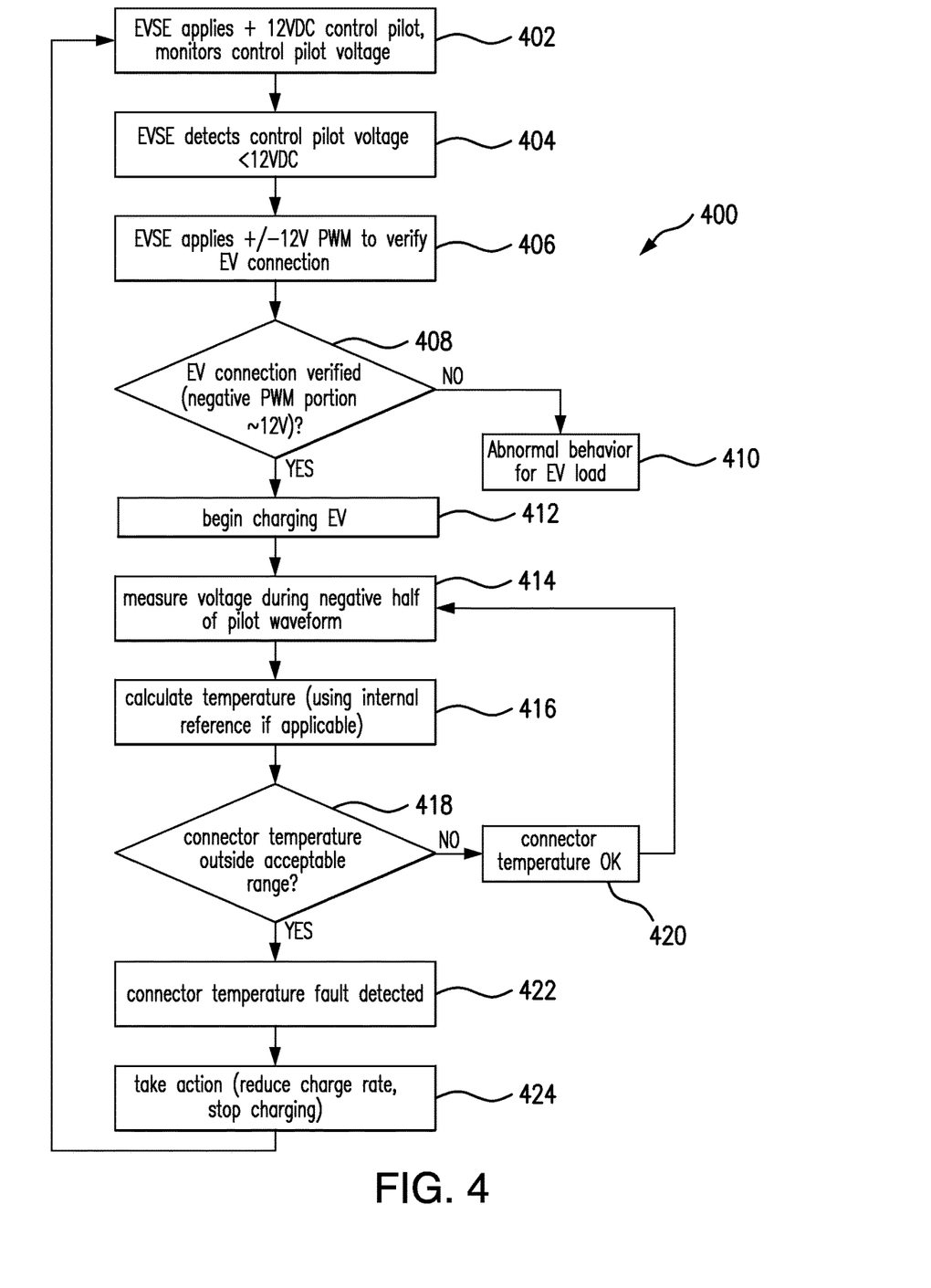
FIG. 4 is a flow diagram of an example process performed by the temperature monitor in the EVSE, to determine whether a connector temperature in the charging handle is above acceptable limits.

FIG. 4 is a flow diagram 400 of an example process performed by the temperature monitor 300 in the EVSE, to determine whether the connector temperature in the charging handle is above acceptable limits. The steps of the flow diagram 400 represent computer code instructions stored in the memory 306 associated with the microprocessor 305, which when executed by the microprocessor 305, carry out the functions of the example embodiments of the invention. The steps may be carried out in another order than shown and individual steps may be combined or separated into component steps. The flow diagram has the following steps:

Step 402: EVSE applies +12 VDC control pilot, monitors control pilot voltage

Step 404: EVSE detects control pilot voltage <12 VDC

Step 406: EVSE applies +/−12V PWM to verify EV connection

Step 408: Is the EV connection verified (negative PWM portion ~12V)?

Step 410: No: abnormal behavior for an EV load

Step 412: Yes: begin charging EV

Step 414: measure voltage during negative half of pilot waveform

Step 416: calculate temperature using internal reference

Step 418: Is the connector temperature outside acceptable range?

Step 420: No: connector temperature OK: Loop back to Step 414:

Step 422: Yes: connector temperature fault detected

Step 424: take action (reduce charge rate, stop charging): Loop back to Step 402

Figure 5:
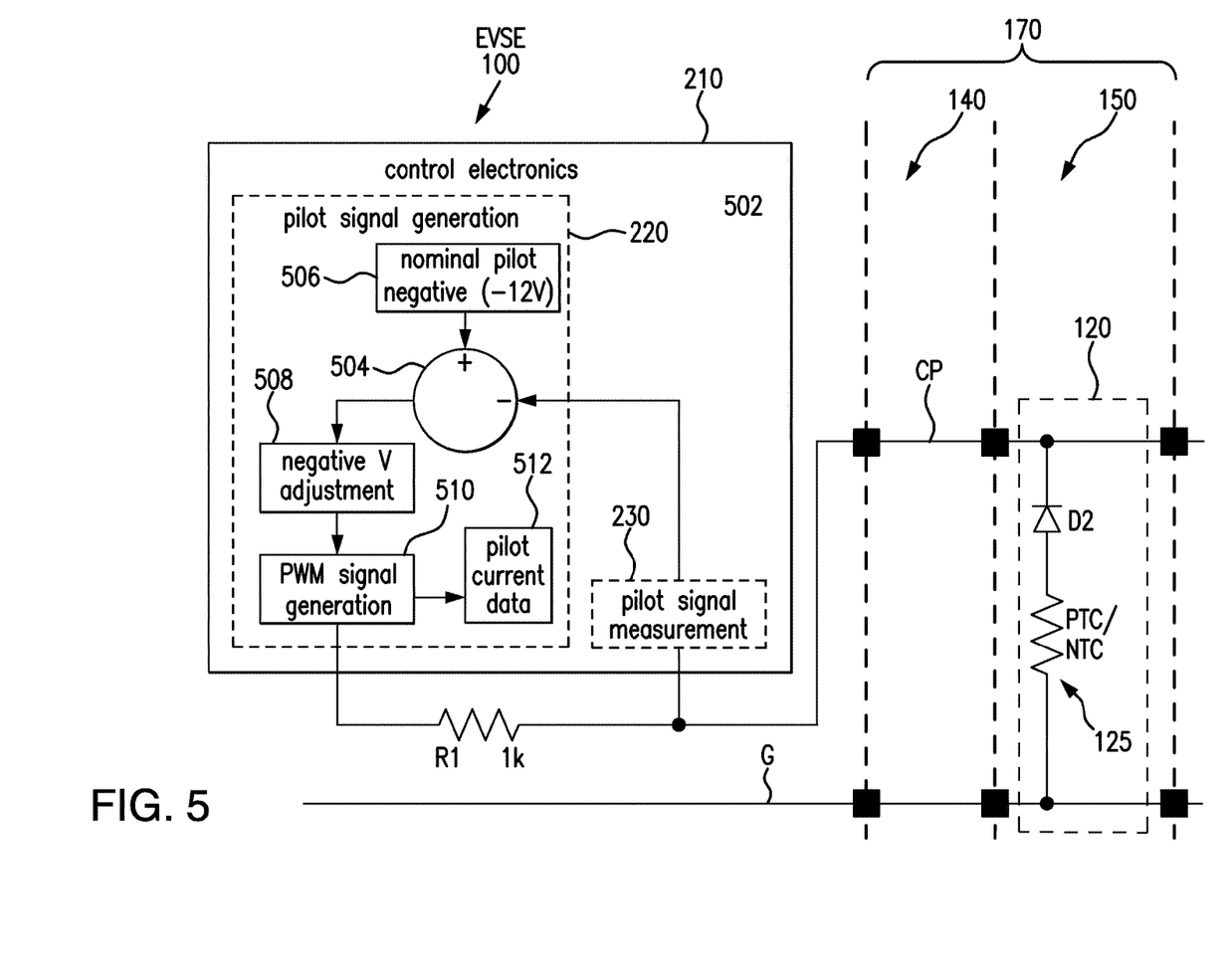
FIG. 5 is a functional block diagram of an example alternate embodiment of the EVSE 100. At the stage before charging starts, the EVSE pilot signal generation circuit interprets a negative control pilot signal that is more positive than −12 volts, as abnormal behavior for an EV load. After charging starts, the EVSE pilot signal generation circuit interprets a negative control pilot signal that is more positive than −12 volts, as a temperature change, and not as abnormal behavior for an EV load.

FIG. 5 is a functional block diagram of an example alternate embodiment of the EVSE 100. At the stage before charging starts, the EVSE pilot signal generation circuit interprets a negative control pilot signal that is more positive than −12 volts, as abnormal behavior for an EV load. After charging starts, the EVSE pilot signal generation circuit interprets a negative control pilot signal that is more positive than −12 volts, as a temperature change, and not as abnormal behavior for an EV load.

It may be desireable to avoid applying a voltage to the control pilot signal CP outside the open circuit limits specified in the SAE J1772 standard, during the negative duty cycle. As an alternative embodiment, the EVSE may be implemented to maintain the negative 12 volt duty cycle voltage at the EV. The EVSE control electronics may measure the handle temperature by measuring either the current through the control pilot signal CP or the voltage adjustment at the pilot signal generation circuit 220, to maintain the nominal pilot signal measurement voltage of minus 12 volts at the EV. The flow diagram of FIG. 4, shows the decision step 408 at a point before charging starts. The control pilot signal is measured by the pilot signal measurement circuit 230 before charging starts and before a temperature rise in the charging handle 150, to check whether the negative control pilot signal is −12 volts. If the negative control pilot signal is not −12 volts, then step 410 determines that something other than an EV is connecting to the handle 150. At the stage before charging starts, the pilot signal generation circuit 220 interprets a negative control pilot signal that is more positive than −12 volts, as abnormal behavior for an EV load.

After the first decision step 408 when charging starts, as shown in the flow diagram of FIG. 4, circuitry in the pilot signal generation circuit 220 operates so that control pilot signal negative voltages that are more positive than minus 12 volts are interpreted as a temperature change, and not interpreted as, as abnormal behavior for an EV load. Thus, during the charging stage, if there is any heating in the charging handle 150, control pilot signal negative voltages that are more positive than minus 12 volts are correctly interpreted by temperature sensor 120 as a rise in temperature. During the charging stage, the pilot signal measurement circuit 230 monitors whether the negative control pilot signal is −12 volts, as a measure of the temperature. During the charging stage, the comparator circuit 504 in the control electronics 210, measures the difference between the nominal control pilot signal negative 12 volt value and the measurement of the actual control pilot signal voltage by the pilot signal measurement circuit 230. In an example embodiment, a negative voltage adjustment module 508 receives the difference from the comparator 504 and makes an adjustment to the pulse width modulation (PWM) signal generation module 510 to return the negative control pilot signal to −12 volts, to correct for any deviation in the measured voltage on the control pilot line 115. The pilot current data 512 is then output on the control pilot line 115 with the negative portion brought back to −12 volts.

Figure 6:
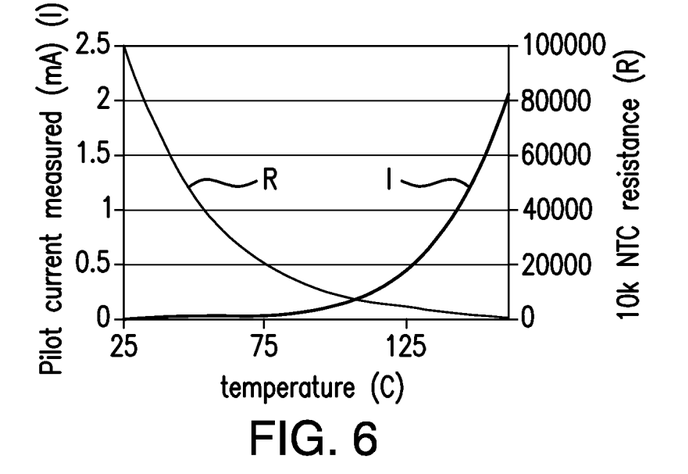
FIG. 6 is an example graph of measured control pilot signal current and negative temperature coefficient (NTC) thermistor resistance vs temperature, for control pilot signal measurement values during the negative part of the control pilot signal.

FIG. 6 is an example graph of measured pilot signal current and NTC thermistor 125 resistance vs temperature, for pilot signal measurement values during the negative part of the pilot signal. The EVSE control electronics can measure the handle temperature by measuring either the current through the control pilot signal or the voltage adjustment required at the pilot signal generation to maintain the nominal pilot signal measurement voltage.

The invention allows the EVSE to take action when it detects a temperature fault, or temperature outside the nominal range. The EVSE may reduce the charging rate offered to the EV to decrease resistive heating of conductors and contact points within the charging handle. This may allow the EV to continue charging, at a reduced rate, while reducing the temperature to within nominal limits. The EVSE may also completely discontinue charging the EV, if the measured temperature does not return to the nominal limits. The EVSE may indicate the temperature rise problem to the user, or signal an undesired operating condition to the owner or operator of the EVSE to initiate maintenance of the cordset. The EVSE may incorporate another temperature sensor internal to the main enclosure to decrease false detection by having an ambient temperature reference. By actively monitoring temperature within the charging handle and allowing intelligent actions to be taken based on the measured temperature, the invention increases the availability, reliability and maintainability of the EVSE.

In an example embodiment of the invention, the EVSE may perform a method for temperature measurement in a charging handle of an EVSE, comprising the steps of:

transmitting on a control pilot line to an electric vehicle connected to a charging handle, a control pilot signal having positive and negative voltage portions;

measuring negative portions of the control pilot signal on the control pilot line, resulting from a thermistor in the charging handle conducting current from a ground line to the control pilot line in response to changes in temperature in the charging handle; and determining that the temperature of the charging handle exceeds a predetermined threshold temperature, based on the measurement.

The method may further comprise one or more of the following steps:

reducing a charging rate offered by the EVSE to an electric vehicle, in response to determining that the temperature of the charging handle exceeds a predetermined threshold temperature;

discontinuing charging of an electric vehicle, if the measured temperature does not return to nominal limits, in response to determining that the temperature of the charging handle exceeds a predetermined threshold temperature; and/or indicating a temperature rise problem to a user or signaling an undesired operating condition to an owner or operator of the EVSE, in response to determining that the temperature of the charging handle exceeds a predetermined threshold temperature.

In alternate example embodiments of the invention the temperature sensor 120 connected between the control pilot line and a ground line in the charging handle may be an alternate type of temperature sensing device, instead of a diode D2 and a thermistor. For example, an integrated circuit temperature sensor may generate a voltage or current output signal related to temperature, which may be coupled to the control pilot line 115 so that a change in current conducted from the ground line G to the control pilot line 115 occurs when the integrated circuit temperature sensor is exposed to a change in temperature in the charging handle 150.

The invention provides detection of connector overheating and prevents thermal runaway and further damage. The invention allows direct measurement of the temperature in the charging handle to provide information for taking corrective actions. The invention does not require significant additional infrastructure in the EVSE. The invention may be implemented using the existing charging handle with a small hardware modification, using the existing cord without any modification, using the existing EVSE without necessarily requiring any hardware modification and just a firmware addition for the measurement and corrective actions implemented. The resulting invention reduces the chances of overheating and possibly melting the charging handle while the handle is fastened to the EV during charging operations.

Although specific example embodiments of the invention have been disclosed, persons of skill in the art will appreciate that changes may be made to the details described for the specific example embodiments, without departing from the spirit and the scope of the invention.

The invention claimed is:

1. A charging handle of an electric vehicle charging station with a circuit for temperature measurement of said handle, said circuit comprising:

a temperature sensor connected between a control pilot line and a ground line in a charging handle of an electric vehicle charging station, wherein a change in current conducted from the ground line to the control pilot line occurs when the temperature sensor is exposed to a change in temperature in the charging handle; and a temperature monitor in the charging station, the temperature monitor being coupled to a pilot signal measurement circuit connected to the control pilot line, to measure negative portions of the control pilot signal resulting from the temperature sensor conducting current from the ground line to the control pilot line in response to changes in the temperature in the charging handle; and wherein, before charging starts, the pilot signal measurement circuit is configured to interpret a negative control pilot signal that is more positive than a negative reference voltage, as abnormal behavior for an electric vehicle load, and after charging starts, the pilot signal measurement circuit is configured to interpret a negative control pilot signal that is more positive than the negative reference voltage, as a temperature change, and not as abnormal behavior for an electric vehicle load.

2. The circuit for temperature measurement in a charging handle of an electric vehicle charging station of claim 1, wherein the control pilot line is coupled to a control pilot signal generator in the charging station, the control pilot signal generator transmitting on the control pilot line to an electric vehicle connected to the charging handle, a control pilot signal having positive and negative voltage portions.

3. The circuit for temperature measurement in a charging handle of an electric vehicle charging station of claim 1, further comprising:
a temperature monitor in the charging station, the temperature monitor being coupled to a pilot signal measurement circuit, to measure the negative portions of the control pilot signal resulting from the temperature sensor conducting current from the ground line to the control pilot line in response to changes in the temperature in the charging handle.

4. The circuit for temperature measurement in a charging handle of an electric vehicle charging station of claim 1, wherein the temperature sensor is a diode and a thermistor connected in series between the control pilot line and the ground line in the charging handle of the electric vehicle charging station, wherein the diode's cathode is coupled to the control pilot line so that a change in current conducted from the ground line to the control pilot line occurs when the thermistor is exposed to a change in temperature in the charging handle.

5. The circuit for temperature measurement in a charging handle of an electric vehicle charging station of claim 4, wherein the thermistor is a negative temperature coefficient (NTC) thermistor, so that as the temperature in the charging handle increases, resistance of the thermistor decreases and voltage becomes less negative for negative portions of a control pilot signal on the control pilot line .

6. The circuit for temperature measurement in a charging handle of an electric vehicle charging station of claim 4, wherein the thermistor is a negative temperature coefficient (NTC) thermistor, so that as the temperature in the charging handle increases, resistance of the thermistor decreases and current increases for negative portions of a control pilot signal on the control pilot line.

7. The circuit for temperature measurement in a charging handle of an electric vehicle charging station of claim 1, wherein the control pilot signal operates according to SAE J1772 standards for Electric Vehicle Supply Equipment (EVSE).

8. The circuit for temperature measurement in a charging handle of an electric vehicle charging station of claim 1, wherein when a temperature monitor in the electric vehicle charging station, detects an increase in temperature in the charging handle, the temperature monitor causes at least one of:
reducing a charging rate offered by the charging station to the electric vehicle to decrease resistive heating of conductors and contact points within the charging handle, discontinuing charging the electric vehicle if a measured temperature does not return to nominal limits, indicating a temperature rise problem to a user, and signaling an undesired operating condition to an owner or operator of the charging station.

9. A method for temperature measurement in a charging handle of an electric vehicle charging station, comprising:
transmitting on a control pilot line to an electric vehicle connected to a charging handle, a control pilot signal having positive and negative voltage portions;
measuring negative portions of the control pilot signal, resulting from a temperature sensor in the charging handle conducting current from a ground line to the control pilot line in response to changes in temperature in the charging handle; and
determining that the temperature of the charging handle exceeds a predetermined threshold temperature, based on the measurement;
wherein, before charging starts, a negative control pilot signal that is more positive than a negative reference voltage, is interpreted as abnormal behavior for an electric vehicle load, and after charging starts, a negative control pilot signal that is more positive than the negative reference voltage, is interpreted as a temperature change, and not as abnormal behavior for an electric vehicle load.

10. The method for temperature measurement in a charging handle of an electric vehicle charging station of claim 6 , wherein the temperature sensor is a diode and a thermistor connected in series between the control pilot line and the ground line in the charging handle of the electric vehicle charging station.

11. The method for temperature measurement in a charging handle of an electric vehicle charging station of claim 9, further comprising:
reducing a charging rate offered by the electric vehicle charging station to the electric vehicle, in response to determining that the temperature of the charging handle exceeds a predetermined threshold temperature.

12. The method for temperature measurement in a charging handle of an electric vehicle charging station of claim 9, further comprising:
discontinuing charging of the electric vehicle, if the measured temperature does not return to nominal limits, in response to determining that the temperature of the charging handle exceeds a predetermined threshold temperature.

13. The method for temperature measurement in a charging handle of an electric vehicle charging station of claim 6, further comprising:
indicating a temperature rise problem to a user or signaling an undesired operating condition to an owner or operator of the electric vehicle charging station, in response to determining that the temperature of the charging handle exceeds a predetermined threshold temperature.

* * * * *

UNITED STATES PATENT AND TRADEMARK OFFICE
CERTIFICATE OF CORRECTION

| | |
|---|---|
| PATENT NO. | : 9,804,034 B2 |
| APPLICATION NO. | : 14/541617 |
| DATED | : October 31, 2017 |
| INVENTOR(S) | : Kevin M. Jefferies et al. |

It is certified that error appears in the above-identified patent and that said Letters Patent is hereby corrected as shown below:

In the Claims

In Column 10
Claim 10, Line 36, "handle of an electric vehicle charging station of claim 6" should read, -- "handle of an electric vehicle charging station of claim "9" --

In Column 10
Claim 13, Line 58, "handle of an electric vehicle charging station of claim 6" should read, -- "handle of an electric vehicle charging station of claim "9" --

Signed and Sealed this
Thirteenth Day of March, 2018

Andrei Iancu
*Director of the United States Patent and Trademark Office*